Feb. 9, 1954  J. C. OSBURN ET AL  2,668,647
MOTOR VEHICLE GARMENT HANGER RACK
Filed Jan. 31, 1952  2 Sheets-Sheet 1
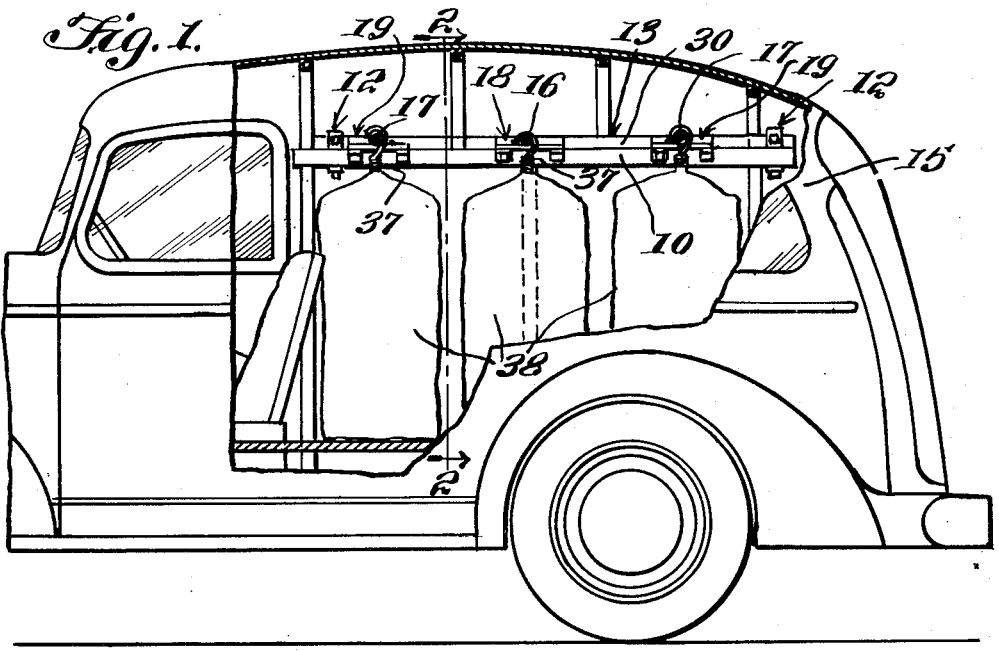
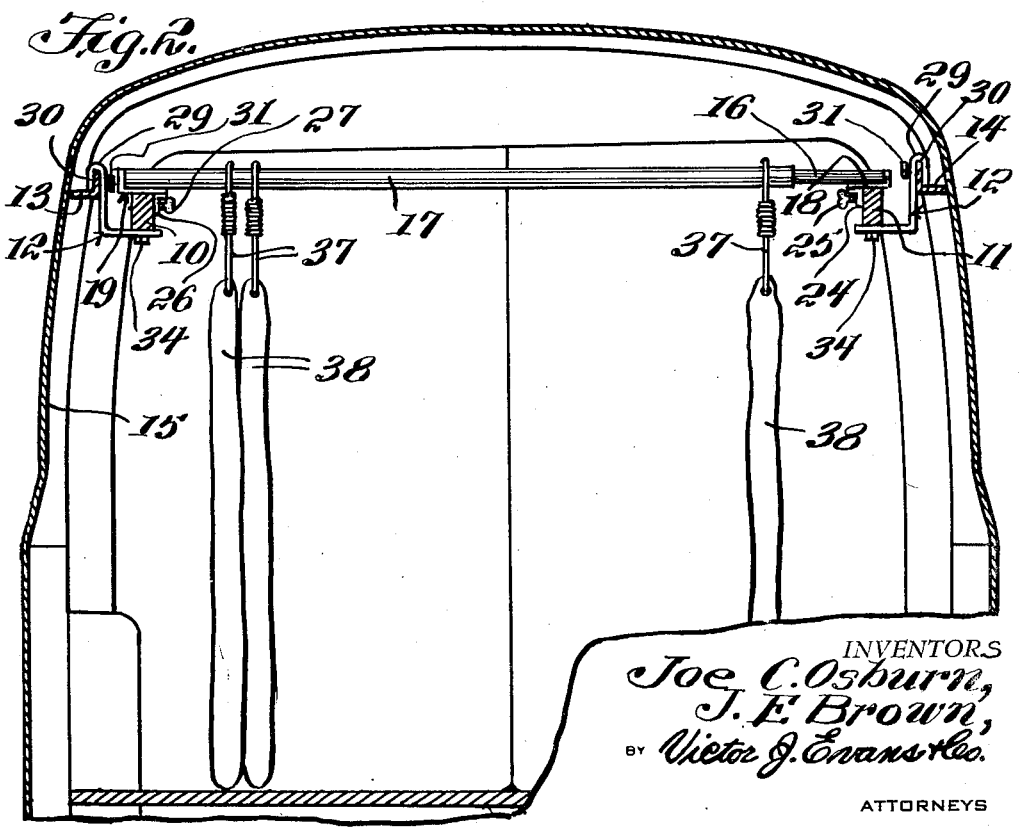
INVENTORS
Joe C. Osburn,
J. F. Brown,
BY Victor J. Evans & Co.
ATTORNEYS Feb. 9, 1954        J. C. OSBURN ET AL        2,668,647
MOTOR VEHICLE GARMENT HANGER RACK
Filed Jan. 31, 1952                 2 Sheets-Sheet 2
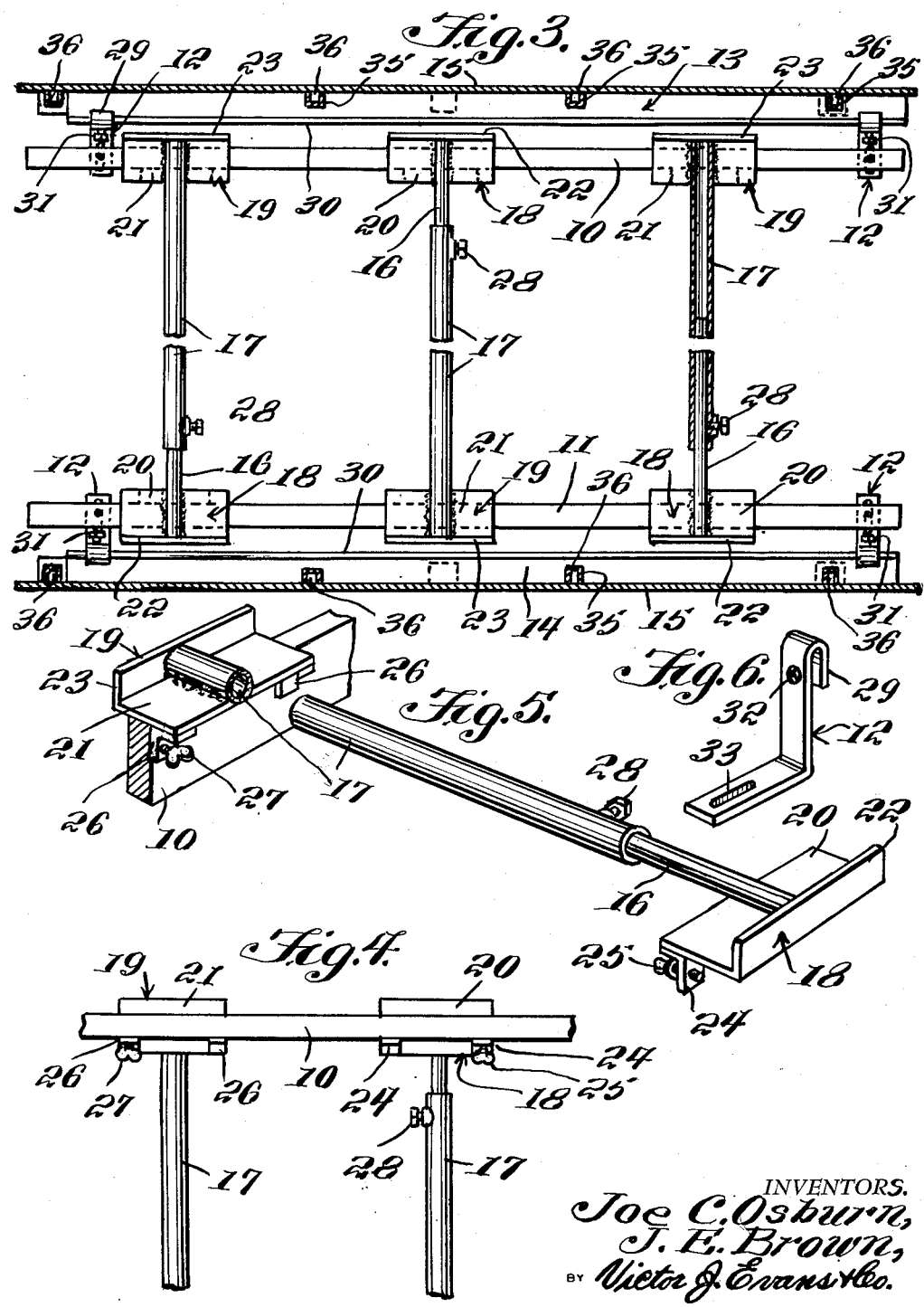

Patented Feb. 9, 1954

2,668,647

UNITED STATES PATENT OFFICE 2,668,647

MOTOR VEHICLE GARMENT HANGER RACK

Joe C. Osburn and James Earl Brown,
Chattanooga, Tenn.

Application January 31, 1952, Serial No. 269,302

3 Claims. (Cl. 224—42.1)

This invention relates to racks for temporarily supporting garment hangers with garments thereon in bodies of trucks used by cleaning establishments, and in particular a pair of side rails adapted to be supported by brackets on the inner surfaces of walls of a delivery truck with transversely disposed rods movably mounted on said rails and adapted to be secured in adjusted positions thereon.

The purpose of this invention is to improve the type of rack used for supporting garments in trucks of cleaning establishments wherein one row of garments may be moved toward an end of a truck when a preceding row is exhausted.

Various types of hangers have been used for supporting garments in motor vehicle truck bodies, however, with the conventional type of delivery truck where the garments are held by hooks on the side walls garments are often damaged by being dropped from hangers and it is also difficult to locate the garments. With this thought in mind this invention contemplates a plurality of telescoping garment hanger supporting rods having shoes with thumb nuts therein on the ends thereof and rails adapted to be mounted by brackets against the inner surfaces of walls of a delivery truck whereby with the shoes positioned on the rails the rods are movable longitudinally of the truck body.

The object of this invention is, therefore, to provide means for supporting rows of garments in a delivery truck body whereby the rows are movable toward the end of the body.

Another object of the invention is to provide a garment supporting rack for delivery truck bodies in which the parts are adjustable whereby the rack is adapted to be mounted in truck bodies of different sizes.

A further object of the invention is to provide a garment supporting rack for delivery truck bodies which is of a simple and economical construction.

With these and other objects and advantages in view the invention embodies angle bars attached to the inner surfaces of the side walls of a truck, depending brackets attached to said angle bars, parallel rails carried by said bracket and tubular cross rods having shoes on the ends with thumb screws therein positioned whereby the shoes travel on the rails whereby garments placed on one rod may be moved toward the driver's seat, another row placed on another rod may be moved to a position intermediate of the length of the truck, and a row of garments positioned on another rod may be spaced from the rear of the truck.

Other features and advantages of the invention will appear from the following description taken in connection with the drawings wherein:

Figure 1 is a side elevational view of the rear portion of a truck body with parts broken away, showing garments hanging from the rack in the body.

Figure 2 is a cross section through the truck body taken on line 2—2 of Fig. 1 showing the method of mounting the rack in the truck body.

Figure 3 is a sectional plan through the upper part of the truck body illustrating the relative position of the rack and mounting elements therefor.

Figure 4 is a detail looking upwardly toward the lower surfaces of the telescoping rods and supporting rails showing the parts on one side of the rack.

Figure 5 is a detail illustrating one of the telescoping rods and showing the shoes on the ends thereof.

Figure 6 is a detail illustrating one of the rail supporting brackets.

Referring now to the drawings wherein like reference characters denote corresponding parts the garment supporting rack of this invention includes a pair of horizontally disposed parallel rails 10 and 11, brackets 12 for supporting the rails, angle irons 13 and 14 positioned on the inner surfaces of the walls of the truck body 15 and telescoping rods in which smaller rods 16 are slidably mounted in tubes 17 and in which the rods 16 are provided with shoes 18 and the tubes 17 with shoes 19.

In the design shown the shoes 18 and 19 are L-shaped in cross section, including horizontally disposed plates 20 and 21 with vertically disposed flanges 22 and 23, respectively and with clip angles 24 having thumb screws 25 therein extended downwardly from the lower surfaces of the plate 20 and similar clip angles 26 with thumb screws 27 therein extended downwardly from the lower surfaces of the plate 21.

The tubes 17 are provided with set screws 28 whereby with the shoes 18 and 19 positioned to slide freely on the rails 10 and 11 the set screws may be tightened to retain the telescoping elements in position.

As illustrated in Fig. 6 the brackets 12 are provided with U-shaped clips 29 on the upper ends which are adapted to be positioned over vertically disposed legs 30 of the mounting angles 13 and 14, and the brackets are provided with set screws 31 which are threaded in openings 32 whereby the brackets are secured in position on the supporting angles.

The brackets 12 are also provided with elongated slots 33 through which bolts 34 extend for attaching the rails 10 and 11 to the brackets.

The angle irons 13 and 14 are provided with notches as indicated by the numeral 35 to provide clearance for ribs 36 on the inner surface of the walls of the truck body and it will be understood that the angles may be welded or otherwise secured to the ribs whereby the angles remain permanently in position.

With the parts arranged in this manner, garment hangers as indicated by the numeral 37 with garments 38 thereon are hooked over the telescoping rods whereby the garments on the end rods are readily accessible and as the end rows of garments are removed the garments on the intermediate rod may be moved toward either end so that they may be positioned to be readily accessible.

In loading the truck the thumb nuts 25 and 27 are unscrewed so that the shoes are free to slide on the rails and as one rod is filled with garments it is moved toward the driver's seat as shown in Fig. 1. The rod supporting another row is moved to an intermediate position and the rod supporting a third row may remain in position at the rear of the truck body so that garments thereon are readily accessible.

It will be understood that the rack may be provdied in different sizes and as many rows of garments as may be desired may be placed thereon.

The supporting angles 13 and 14 may be mounted in the truck body by other means and although the supporting elements are L-shaped in cross section it will be understood that the supporting elements of other designs may be used and the brackets 12 may be attached to the supporting elements or directly to the ribs of the truck body as may be desired.

It will be understood that other modifications may be made in the design and arrangement of the parts without departing from the spirit of the invention.

What is claimed is:

1. In a garment rack for a motor vehicle having a body with side walls, angle irons positioned parallel to said side walls and adapted to be mounted on the inner surfaces of the walls, rails spaced from and positioned parallel to said angle irons, brackets suspended from the angle irons and having extended horizontally disposed sections upon which the rails are carried, shoes slidably mounted on said rails, tubes extended from the shoes on one side of the vehicle, rods carried by the shoes on the opposite side of the vehicle and slidably mounted in said tubes providing telescoping members, and means for clamping the shoes in position upon the rails.

2. In a garment rack for a motor vehicle body having side walls, angle irons positioned parallel to said side walls and adapted to be mounted on the inner surfaces of the walls, rails spaced from and positioned parallel to said angle irons, brackets having clips on the upper ends with which they are suspended from the angle irons and having horizontally disposed sections upon which said rails are carried, shoes, L-shaped in cross section slidably mounted on said rails, horizontally positioned transversely disposed tubes extended from the shoes on one side of the vehicle, horizontally disposed rods carried by the shoes on the opposite side of the vehicle and slidably mounted on said tubes providing telescoping members, and means for clamping the shoes in position upon the rails.

3. In a garment rack for a motor vehicle body having side walls, angle irons positioned parallel to said side walls and adapted to be mounted on the inner surfaces of the walls, rails spaced from and positioned parallel to said angle irons, brackets having clips on the upper ends with which they are suspended from the angle irons and having horizontally disposed sections upon which said rails are carried, shoes, L-shaped in cross section slidably mounted on said rails, horizontally positioned transversely disposed tubes extended from the shoes on one side of the vehicle, horizontally disposed rods carried by the shoes on the opposite side of the vehicle and slidably mounted in said tubes providing telescoping members, means for securing the rails to the said horizontally disposed sections of the brackets, means securing the telescoping sections in adjusted positions, and clip angles having thumb screws threaded therein extended downwardly from said shoes and positioned whereby the thumb screws clamp the shoes and telescoping members in position upon said rails.

JOE C. OSBURN.
J. E. BROWN.

References Cited in the file of this patent

UNITED STATES PATENTS

| Number | Name | Date |
|---|---|---|
| 2,253,423 | Fellers et al. | Aug. 19, 1941 |
| 2,476,476 | Baylor et al. | July 19, 1949 |